United States Patent
Tavildar et al.

(10) Patent No.: US 9,247,412 B2
(45) Date of Patent: *Jan. 26, 2016

(54) POWER EFFICIENT RELAY DISCOVERY PROTOCOL

(71) Applicant: QUALCOMM Incorporated, San Diego, CA (US)

(72) Inventors: Saurabha Rangrao Tavildar, Jersey City, NJ (US); Junyi Li, Chester, NJ (US); Libin Jiang, Bridgewater, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,197

(22) Filed: Apr. 2, 2015

(65) Prior Publication Data
US 2015/0215764 A1 Jul. 30, 2015

Related U.S. Application Data

(63) Continuation of application No. 13/656,347, filed on Oct. 19, 2012.

(51) Int. Cl.
*H04W 8/00* (2009.01)
*H04W 72/04* (2009.01)
(Continued)

(52) U.S. Cl.
CPC .............. *H04W 8/005* (2013.01); *H04B 7/155* (2013.01); *H04W 24/10* (2013.01); *H04W 48/08* (2013.01);
(Continued)

(58) Field of Classification Search
CPC .......................... H04W 24/10; H04B 7/15521
See application file for complete search history.

(56) References Cited

U.S. PATENT DOCUMENTS 5,903,618 A * 5/1999 Miyake et al. ................. 375/356
7,907,540 B2 * 3/2011 Li et al. .......................... 370/252
(Continued)

FOREIGN PATENT DOCUMENTS

| EP | 1890440 A2 | 2/2008 |
|---|---|---|
| WO | WO-2010078210 | 7/2010 |
| WO | WO-2011129654 A2 | 10/2011 |

OTHER PUBLICATIONS

"3rd Generation Partnership Project; Technical Specification Group Services and System Aspects; Service requirements for the Evolved Packet System (EPS)", Release 12, 3GPP Standard; 3GPP TS 22.278, 3rd Generation Partnership Project (3GPP), Mobile Competence Centre; 650, Route Des Lucioles; F-06921 Sophia-Antipolis Cedex; France, vol. SA WG1, No. V12.2.0, Mar. 15, 2013, pp. 1-42, XP050692129, [retrieved on Mar. 15, 2013] p. 25, line 17-line 41.
(Continued)

*Primary Examiner* — Rasheed Gidado
(74) *Attorney, Agent, or Firm* — James K. O'Hare

(57) ABSTRACT

A method, an apparatus, and a computer program product for wireless communication are provided. The apparatus receives discovery resource information from a base station, sends a discovery signal based on the discovery resource information, and receives from at least one user equipment (UE) a request for relaying with the base station based on the discovery signal. The apparatus may also receive a discovery signal from a relay, and send to the relay a request for relaying with a base station based on the discovery signal. The apparatus may further receive a discovery signal from each of a plurality of relays, determine to select one of the plurality of relays based on the discovery signal from each relay, and send to a selected relay a request for relaying with a base station based on the discovery signal when one of the plurality of relays is determined to be selected.

12 Claims, 17 Drawing Sheets

(51) Int. Cl.
*H04W 56/00* (2009.01)
*H04W 48/08* (2009.01)
*H04B 7/155* (2006.01)
*H04W 24/10* (2009.01)
*H04B 7/04* (2006.01)
*H04W 88/04* (2009.01)

(52) U.S. Cl.
CPC .......... *H04W 56/001* (2013.01); *H04W 72/042* (2013.01); *H04B 7/0417* (2013.01); *H04W 88/04* (2013.01); *Y02B 60/50* (2013.01)

(56) References Cited

U.S. PATENT DOCUMENTS

| | | | |
|---|---|---|---|
| 7,961,670 | B2 | 6/2011 | Park et al. |
| 8,169,919 | B2 | 5/2012 | Suh et al. |
| 8,199,721 | B2 | 6/2012 | Jung et al. |
| 8,817,702 | B2 * | 8/2014 | Palanki et al. ............... 370/328 |
| 2007/0076684 | A1 | 4/2007 | Lee et al. |
| 2007/0214286 | A1 | 9/2007 | Muqattash et al. |
| 2008/0057973 | A1 | 3/2008 | Park |
| 2008/0227461 | A1 | 9/2008 | Dayal et al. |
| 2009/0270109 | A1 | 10/2009 | Wang Helmersson et al. |
| 2009/0325625 | A1 | 12/2009 | Hugl et al. |
| 2010/0039947 | A1 | 2/2010 | Li et al. |
| 2010/0067427 | A1 | 3/2010 | Choudhury |
| 2010/0142433 | A1 * | 6/2010 | Womack et al. ............... 370/315 |
| 2010/0157845 | A1 | 6/2010 | Womack et al. |
| 2010/0167743 | A1 | 7/2010 | Palanki et al. |
| 2010/0261426 | A1 | 10/2010 | Shin et al. |
| 2010/0261480 | A1 | 10/2010 | Cho et al. |
| 2011/0117907 | A1 | 5/2011 | Hooli et al. |
| 2011/0149769 | A1 | 6/2011 | Nagaraja |
| 2011/0228680 | A1 | 9/2011 | Ball et al. |
| 2011/0256827 | A1 | 10/2011 | Hart |
| 2011/0310747 | A1 | 12/2011 | Seo et al. |
| 2012/0236783 | A1 | 9/2012 | Park et al. |
| 2012/0265818 | A1 | 10/2012 | Van Phan et al. |
| 2013/0016630 | A1 | 1/2013 | Bhushan et al. |
| 2013/0021932 | A1 | 1/2013 | Damnjanovic et al. |
| 2013/0083722 | A1 | 4/2013 | Bhargava et al. |
| 2013/0165127 | A1 | 6/2013 | Ikegami |
| 2013/0244715 | A1 | 9/2013 | Kwon et al. |
| 2014/0066119 | A1 | 3/2014 | Tavildar et al. |
| 2014/0112162 | A1 | 4/2014 | Tavildar et al. |
| 2014/0329535 | A1 | 11/2014 | Sadiq et al. |

OTHER PUBLICATIONS

Calcev, et al., "Opportunistic two-hop relays for OFDMA cellular networks," 2008 IEEE GLOBECOM Workshops, Nov. 2008, pp. 1-6.
Fodor, et al., "Design aspects of network assisted device-to-device communications," IEEE Communications Magazine, Mar. 2012, vol. 50; Issue. 3, pp. 170-177.
Gkatzikis L., et al., "Low complexity algorithms for relay selection and power control in interference-limited environments," Modeling and Optimization in Mobile, Ad Hoc and Wireless Networks (WIOPT), 2010 Proceedings of the 8th International Symposium on, IEEE, Piscataway, NJ, USA, May 31, 2010, pp. 278-287, XP031714617, ISBN: 978-1-4244-7523-0.
International Preliminary Report on Patentability—PCT/US2013/065740, The International Bureau of WIPO—Geneva, Switzerland, Jan. 22, 2014.
International Search Report and Written Opinion—PCT/US2013/058549—ISA/EPO—Nov. 8, 2013.
International Search Report and Written Opinion—PCT/US2013/065740—ISA/EPO—Jan. 8, 2014.
International Search Report and Written Opinion—PCT/US2014/035848—ISA/EPO—Dec. 5, 2014.
Karaer et al., "Uplink performance optimization in relay enhanced LTE-Advanced networks," IEEE 20th International Symposium Personal, Indoor and Mobile Radio Communications, Sep. 2009, pp. 360-364.
Lei L., et al., "Operator controlled device-to-device communications in LTE-advanced networks", IEEE Wireless Communications, IEEE Service Center, Piscataway, NJ, US, vol. 19, No. 3 Jun. 1, 2012, pp. 96-104, XP011480414, ISSN: 1536-1284, DOI: 10.1109/MWC.2012.6231164 p. 3-p. 7.
LG Electronics et al., "Some Issues to consider for ProSe UE-to-UE Relay", 3GPP Draft; Draft S1-133101 LGE-Disc Some Issues to Consider for Prose UE-to-UE Relay V02, 3rd Generation Partnership Project (3GPP), Mobile Competence Centre; 650, Route Des Lucioles; F-06921 Sophi vol. SA WG1, no. New Delhi, India; 201330506-20130510 Apr. 26, 2013, pp. 1-3, XP050707548, Retrieved from the Internet: URL: http://www.3gpp.org/ftp/tsg_sa/WG1_Serv/TSGS1_62_New_Delhi/docs/ [retrieved—on Apr. 26, 2013] section 2-section 3.
Raghothaman, et al. "System Architecture for a Cellular Network with Cooperative Mobile Relay," Vehicular Technology Conference (VTC Fall), 2011 IEEE, pp. 1-5.
Vanganuru, et al., "Uplind system capacity of a cellular network with cooperative mobile relay," Wireless Telecommunicatioins Symposium (WTS), Apr. 2011, pp. 1-7.

* cited by examiner

POWER EFFICIENT RELAY DISCOVERY PROTOCOL

CROSS REFERENCE TO RELATED APPLICATIONS

This application is a continuation of U.S. patent application Ser. No. 13/656,347 filed on Oct. 19, 2012 entitled "POWER EFFICIENT RELAY DISCOVERY PROTOCOL" which is hereby incorporated in its entirety by reference.

BACKGROUND

1. Field

The present disclosure relates generally to communication systems, and more particularly, to a power efficient relay discovery protocol.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives discovery resource information from a base station, sends a discovery signal based on the discovery resource information; and receives from at least one user equipment (UE) a request for relaying with the base station based on the discovery signal.

In a further aspect of the disclosure, the apparatus receives a discovery signal from a relay, and sends to the relay a request for relaying with a base station based on the discovery signal.

In another aspect of the disclosure, the apparatus receives at a user equipment (UE) a discovery signal from each of a plurality of relays, determines to select one of the plurality of relays based on the discovery signal from each relay, sends to a selected relay a request for relaying with a base station based on the discovery signal when one of the plurality of relays is determined to be selected, and communicates with the base station via the selected relay.

DETAILED DESCRIPTION

Figure 1:
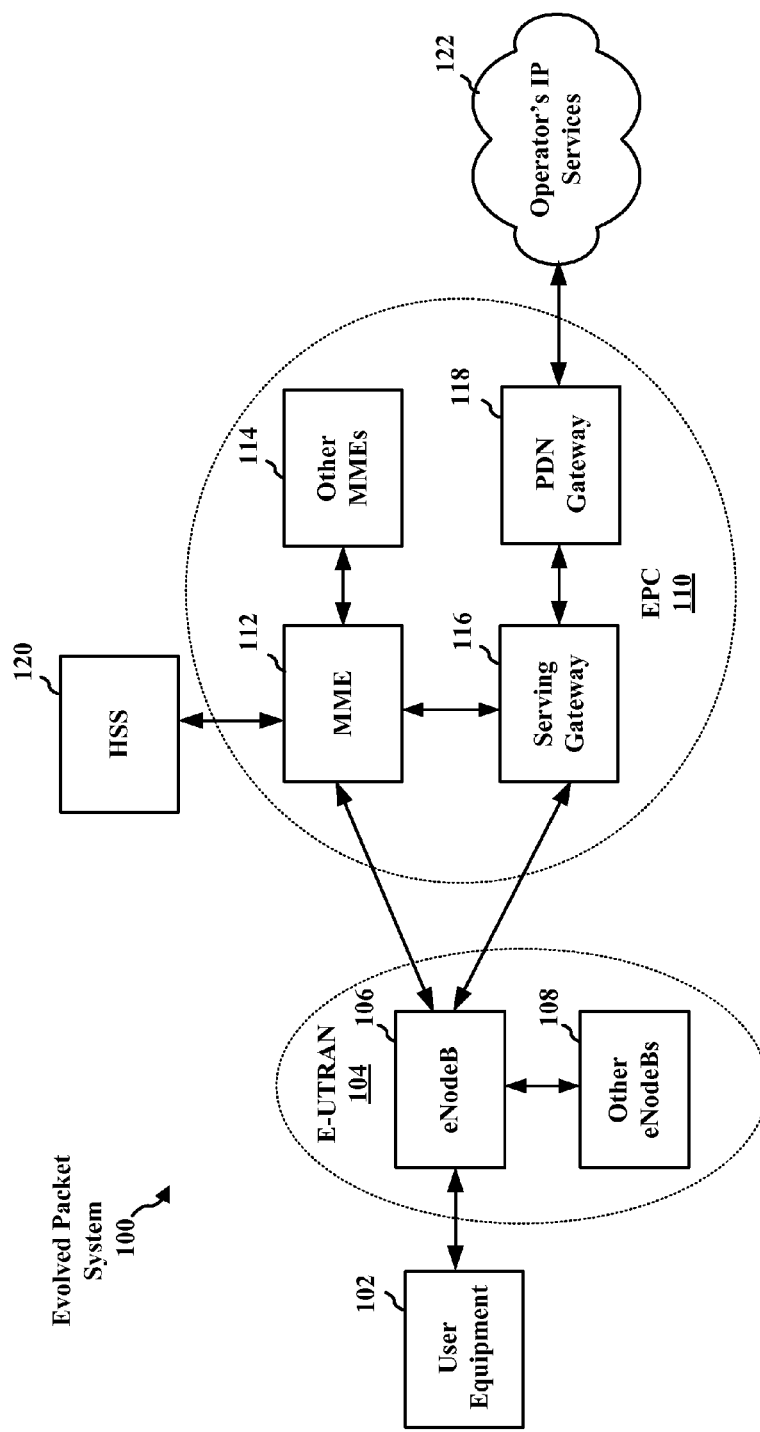
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
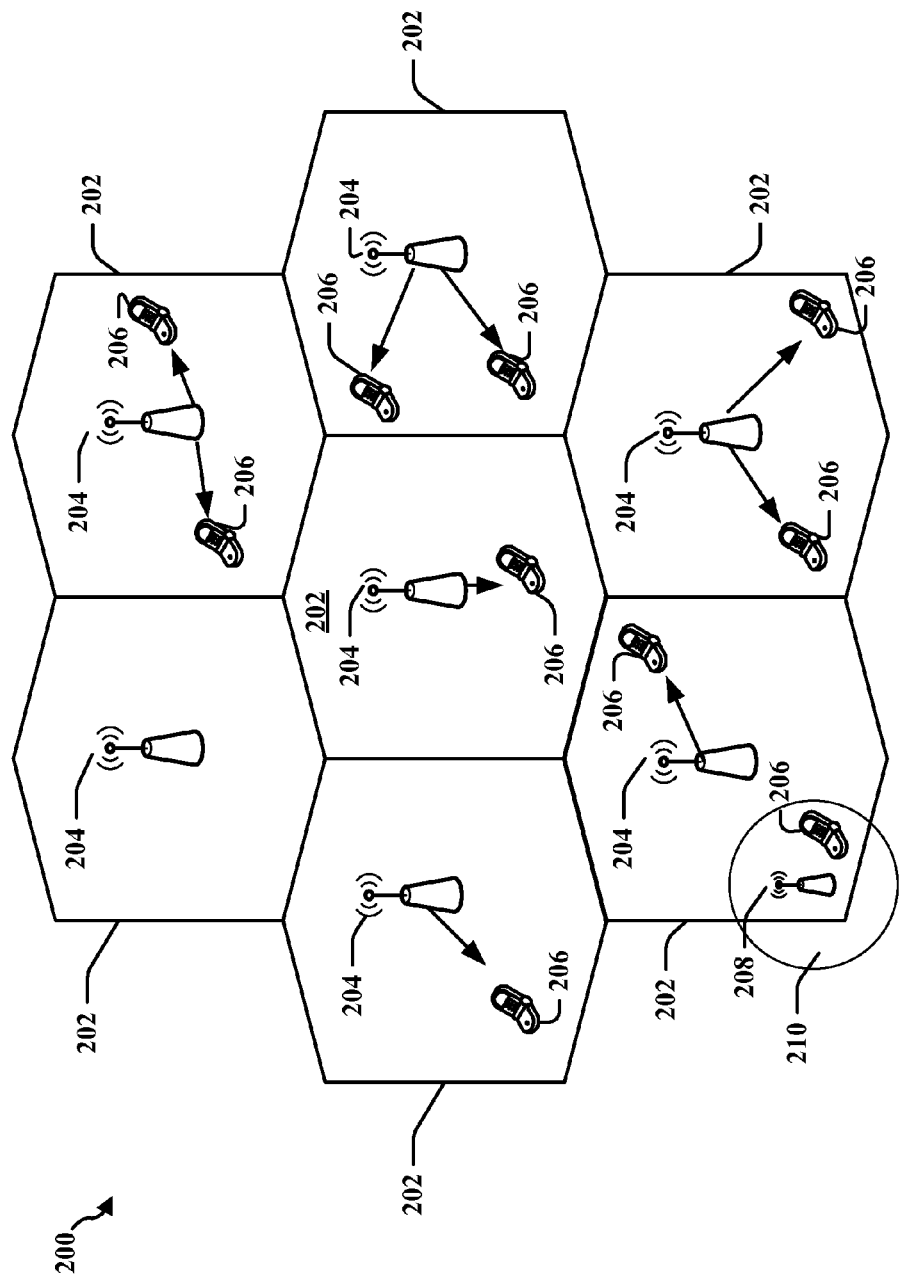
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
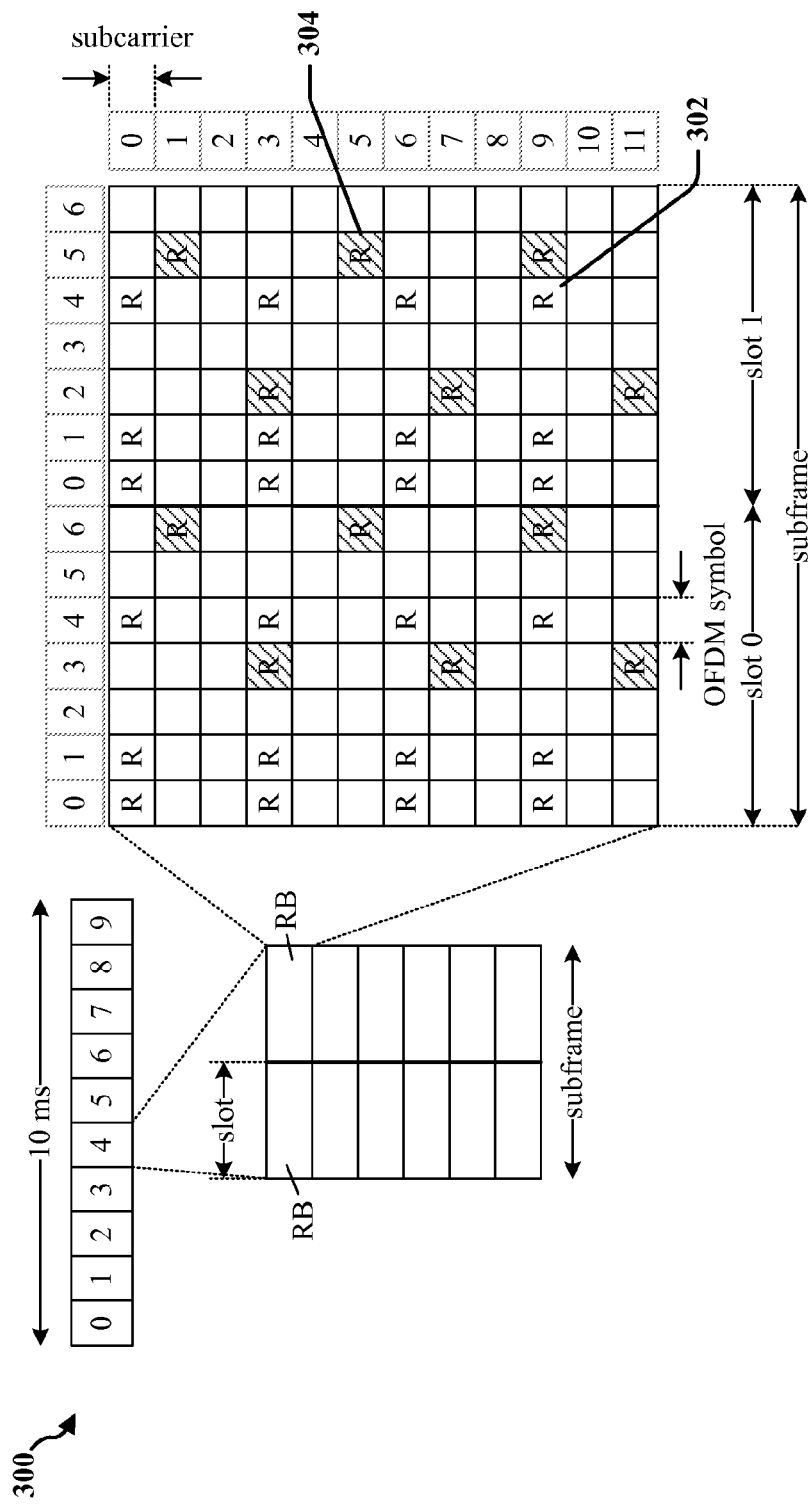
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
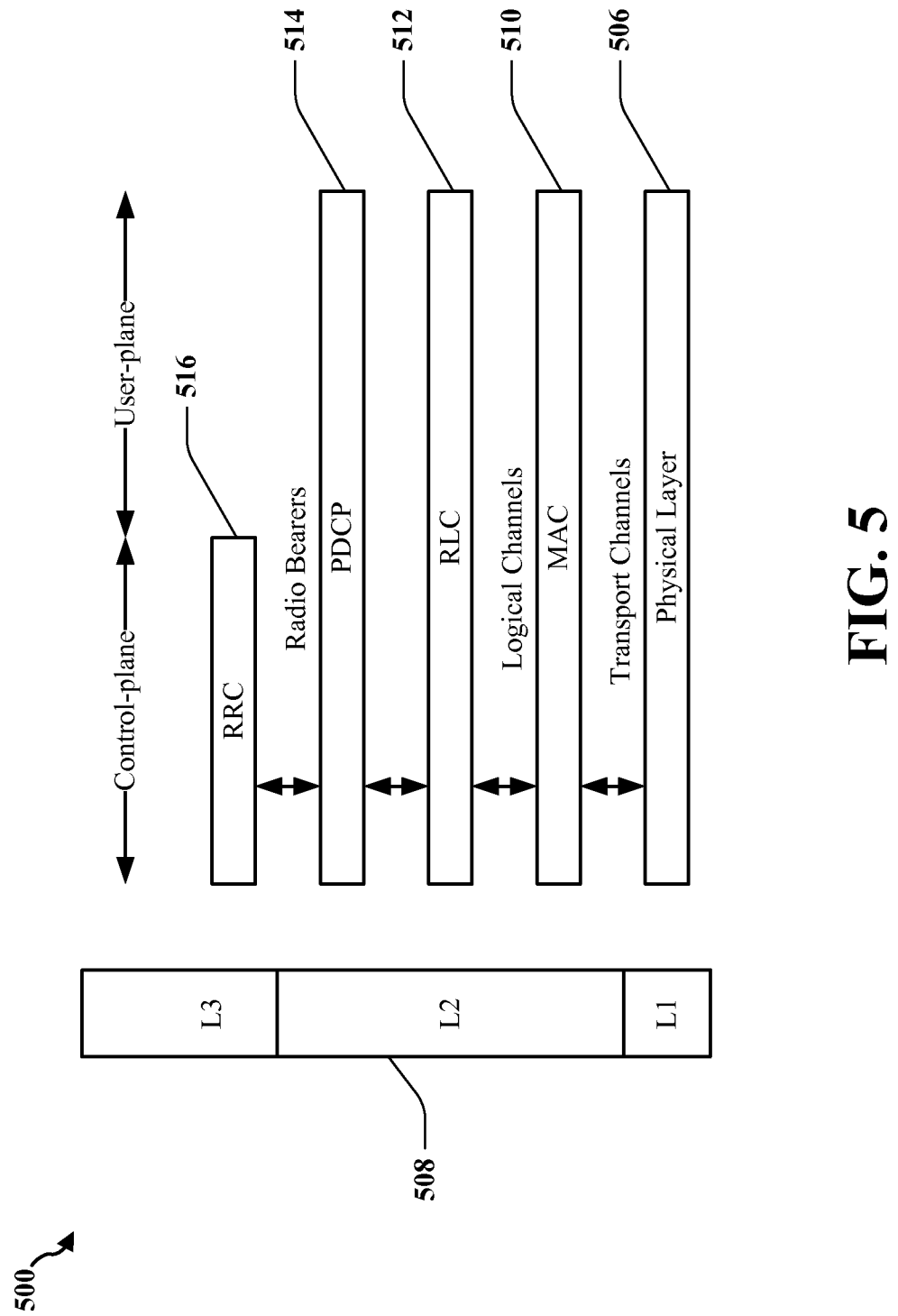
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs.

The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
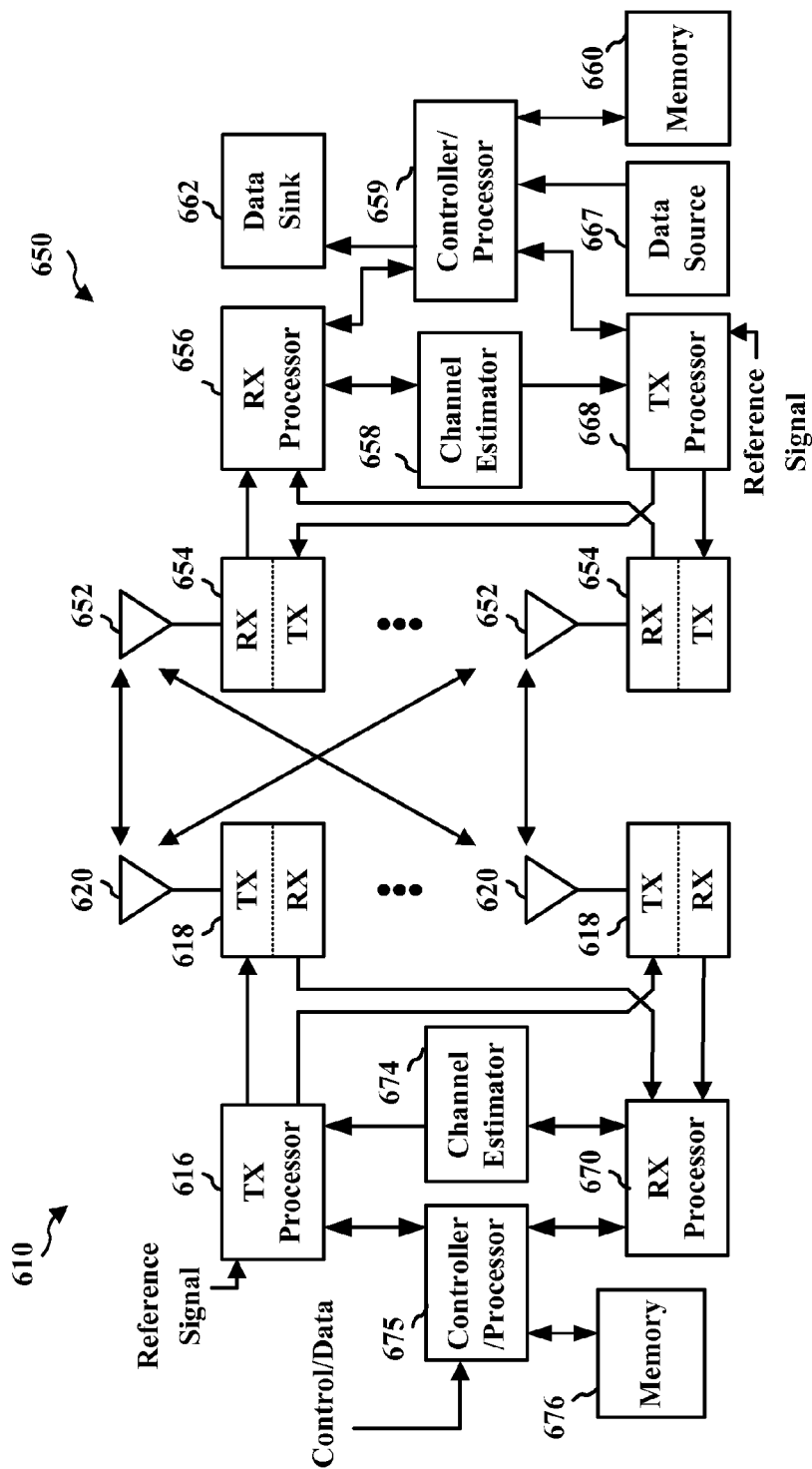
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
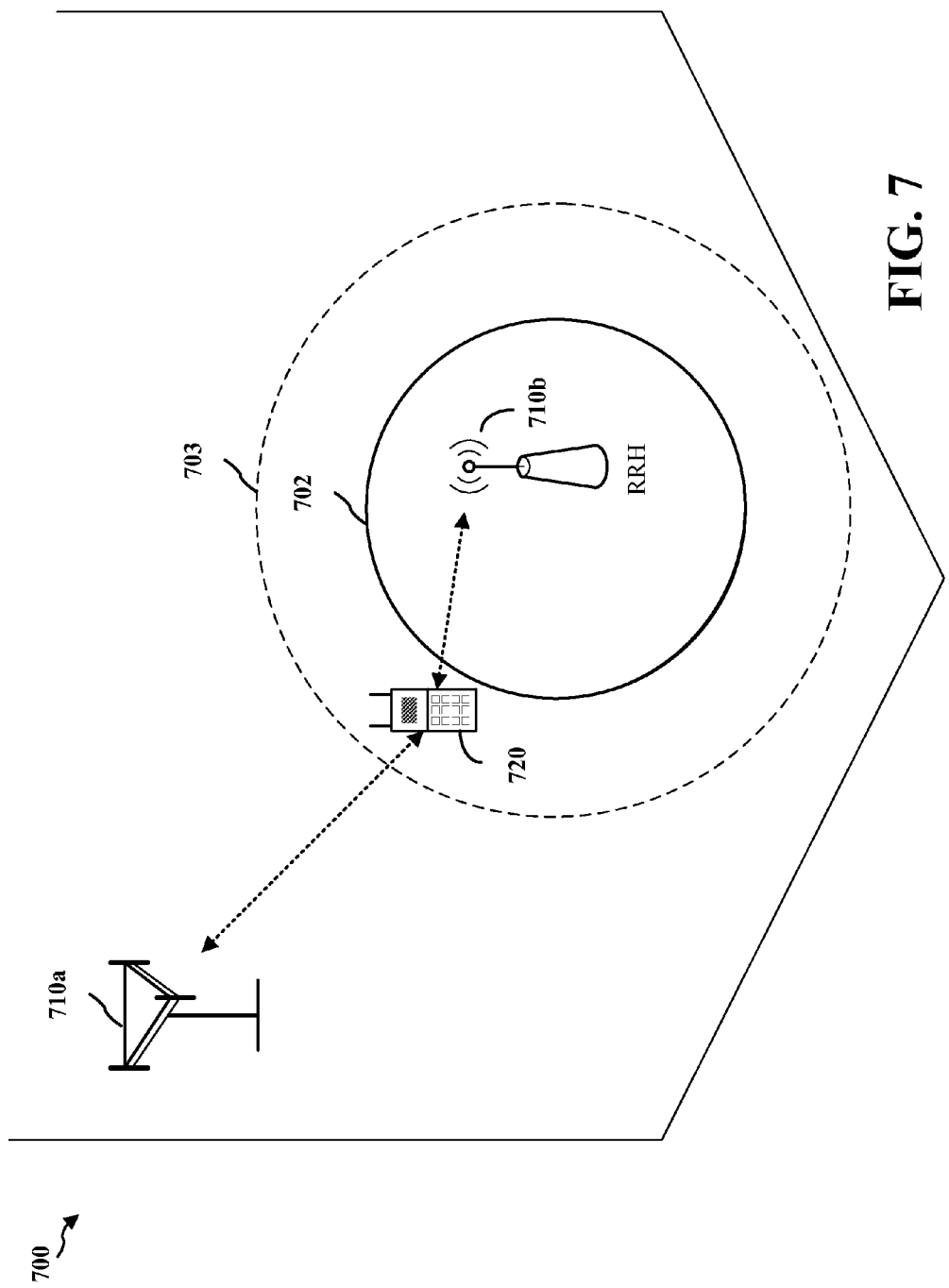
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8:
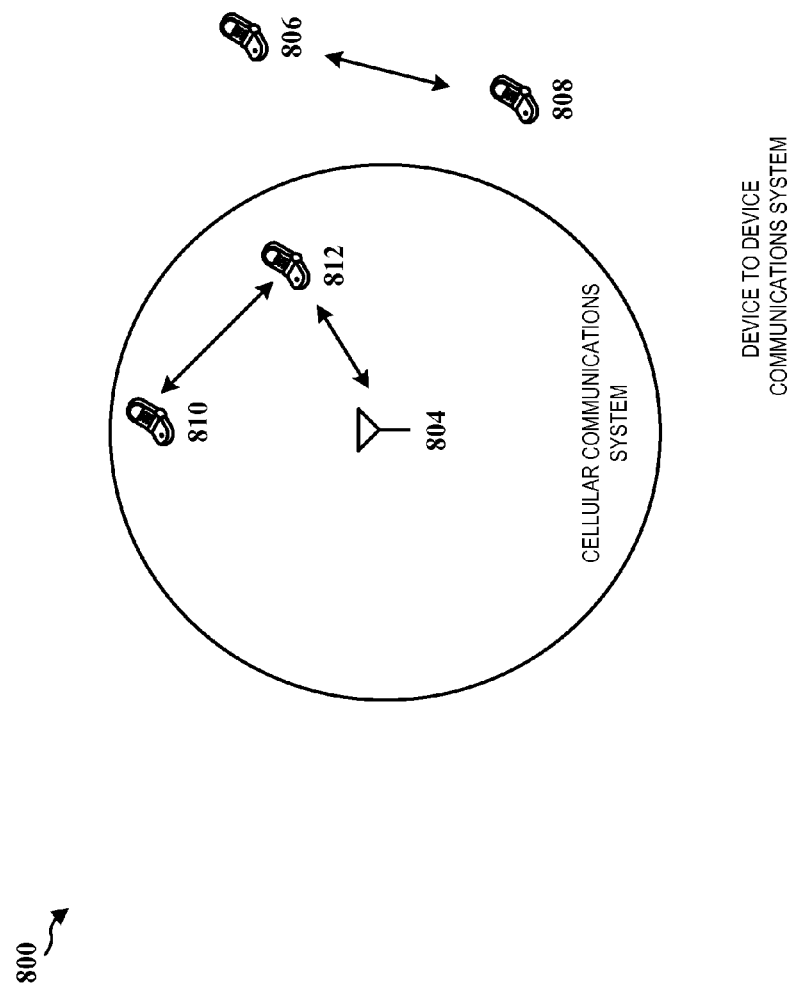
FIG. 8 is a diagram of an exemplary device-to-device (D2D) communications system.

FIG. 8 is a diagram 800 of an exemplary device-to-device (D2D) communications system. The device-to-device communications system 800 includes a plurality of wireless devices 806, 808, 810, 812. The device-to-device communications system 800 may overlap with a cellular communications system, such as for example, a wireless wide area network (WWAN). Some of the wireless devices 806, 808, 810, 812 may communicate together in device-to-device communication, some may communicate with the base station 804, and some may do both. For example, as shown in FIG. 8, the wireless devices 806, 808 are in device-to-device communication and the wireless devices 810, 812 are in device-to-device communication. The wireless device 812 is also communicating with the base station 804.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

An LTE communication system may utilize relays to facilitate communication between a UE and a base station. Current relays are similar to base stations, and essentially split a UE-base station link into two links: 1) an access link; and 2) a backhaul link. The access link refers to the link between an edge UE and the relay. The backhaul link refers to the link between the relay and the base station. If the relay is reasonably located in an ideal position, signaling on the backhaul link may be much stronger than signaling on an actual direct link between the base station and the edge UE. Hence, system throughput is improved. In an aspect, D2D technology may be utilized for relaying in an LTE communication system. This may include using a UE as the relay, and implementing a new relay architecture between a relay UE and an edge UE.

Figure 9:
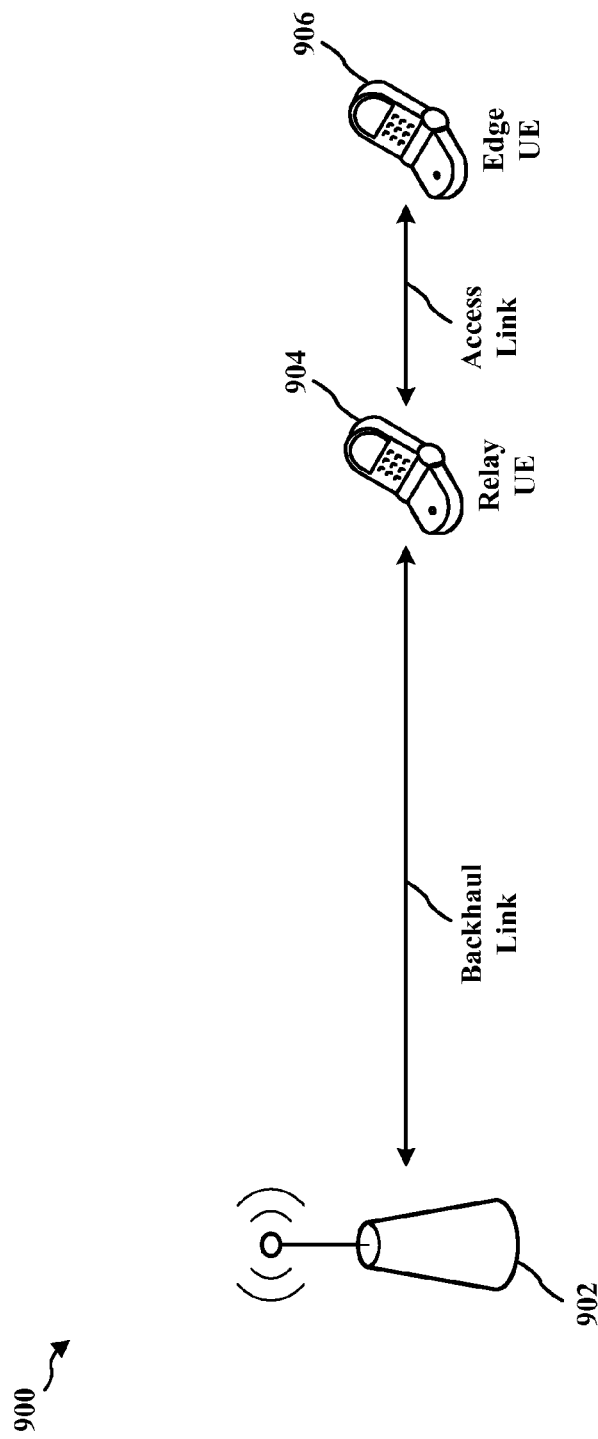
FIG. 9 is a diagram illustrating exemplary relaying in a communication system.

FIG. 9 is a diagram 900 illustrating exemplary relaying in a communication system. A communication link between an eNB 902 and a relay UE 904 may be referred to as a backhaul link. A communication link between the relay UE 904 and an edge UE 906 may be referred to as an access link. In the disclosure, the edge UE may refer to a UE at the edge of a cell. However, the edge UE may also refer to any UE other than the relay UE.

In an aspect, an architecture is provided for using device-to-device (D2D) relays in a long term evolution (LTE) communication system where idle UEs are used as relays based on channel conditions. In particular, a discovery mechanism is provided for D2D relays in LTE that is power efficient and suited for optimizing a system throughput via appropriate relay selection.

Traditionally, relay discovery may be performed similar to a cell search/association protocol in LTE. However, when using such protocol, relays are required to be constantly on (e.g., active, non-idle, etc.), impacting power consumption. Interference due to inactive relays is also increased.

In an aspect of the disclosure, relay UEs may only send discovery-like signals on a slow time scale. Synchronization signals may not be sent. Thus, both relay and edge UEs may depend on a macro network for synchronization.

In addition, a discovery signal may carry information to help make relay selection decisions. For example, relevant information that may be sent along with the discovery signal may include: 1) Downlink signal-to-interference-plus-noise ratio (SINR) observed by a relay; 2) Uplink interference observed by the relay; and 3) Uplink pathloss to an eNB used by the relay.

The downlink SINR observed by the relay (item 1) may be useful for an edge UE to compare with its own downlink SINR to assess the gains of relaying. Together, the uplink interference observed by the relay (item 2) and the uplink pathloss to an eNB used by the relay (item 3) may be used by the edge UE to determine an uplink transmission rate as well as an access link rate. The edge UE may also measure an access link pathloss based on discovery signals received from the relay, and additionally use the measured access link pathloss to calculate the access link rate.

From a relay UE perspective, the relay UE may derive synchronization from a macro cell. Moreover, the relay UE may measure a backhaul downlink SINR, aggregate uplink interference, and uplink pathloss to the eNB. The relay UE may also broadcast the measured backhaul downlink SINR, aggregate uplink interference, and uplink pathloss to the eNB in a discovery message in a periodic manner (e.g., every 1 second).

From an edge UE perspective, the edge UE may derive synchronization from a macro cell. Moreover, the edge UE may receive discovery signals from relay UEs. Notably, the edge UE may measure pathloss of the discovery signals. The edge UE may also measure aggregate uplink interference observed at the edge UE.

The edge UE may use the received discovery signals, the measured pathloss of the discovery signals, and the measured aggregate uplink interference to predict/determine: 1) Backhaul downlink SINR (and rate); 2) Backhaul uplink SINR (and rate); and 3) Downlink access link rate and uplink access link rate. The edge UE may then select a relay UE based on the determined backhaul downlink SINR (and rate), backhaul uplink SINR (and rate), downlink access link rate, and uplink access link rate.

Figure 10:
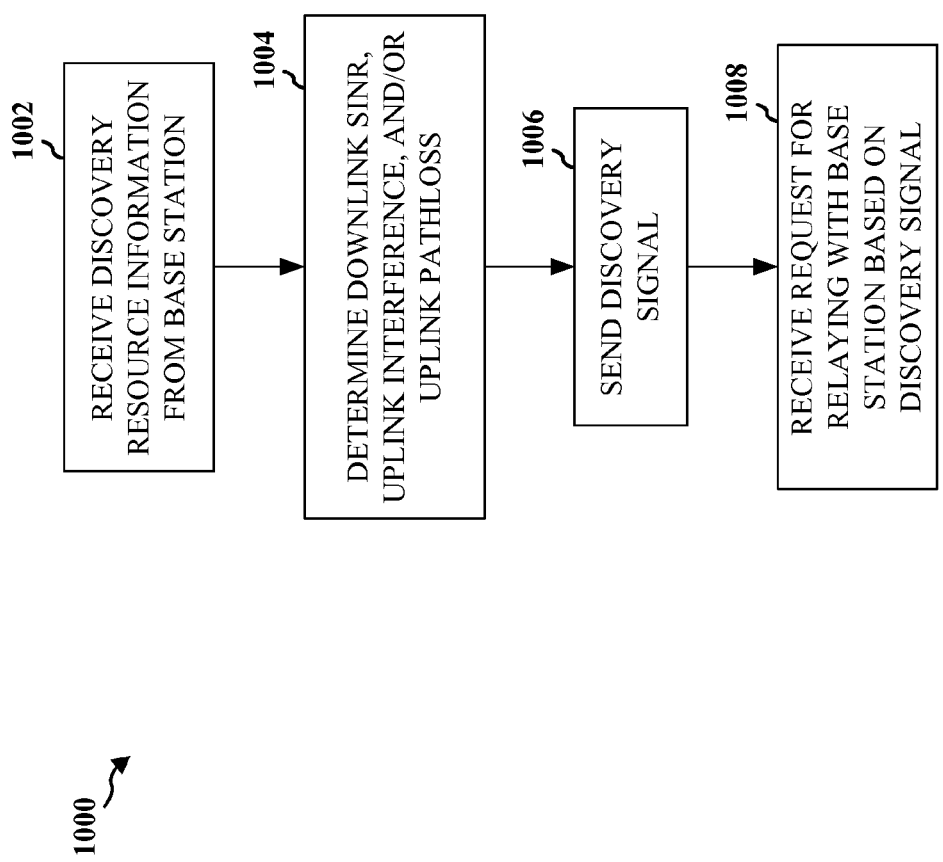
FIG. 10 is a flow chart of a method of wireless communication.

FIG. 10 is a flow chart 1000 of a method of wireless communication. The method may be performed by a relay, such as a relay UE. At step 1002, the relay receives discovery resource information from a base station. At step 1004, the relay may determine a backhaul downlink signal-to-interference-plus-noise ratio (SINR), a backhaul uplink interference, and/or a backhaul uplink pathloss.

At step 1006, the relay sends a discovery signal based on the discovery resource information. The discovery signal may be sent in a periodic manner to at least one UE. The relay may broadcast the discovery signal to the at least one UE. The discovery signal may include the determined backhaul downlink SINR, backhaul uplink interference, and/or backhaul uplink pathloss. At step 1006, the relay may receive from the at least one UE a request for relaying with the base station based on the discovery signal.

Figure 11:
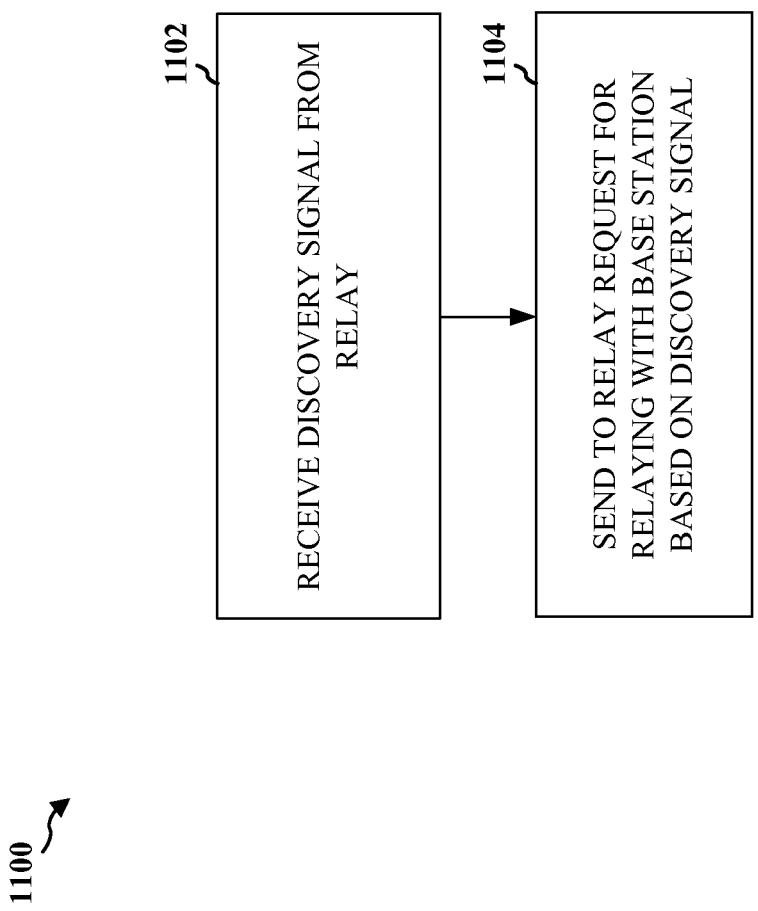
FIG. 11 is a flow chart of a method of wireless communication.

FIG. 11 is a flow chart 1100 of a method of wireless communication. The method may be performed by a UE, such as an edge UE. At step 1102, the UE receives a discovery signal from a relay. The discovery signal may be broadcasted to the UE in a periodic manner. The discovery signal may include a backhaul downlink signal-to-interference-plus-noise ratio (SINR), a backhaul uplink interference, and/or a backhaul uplink pathloss. At step 1104, the UE sends to the relay a request for relaying with a base station based on the discovery signal.

Figure 12:
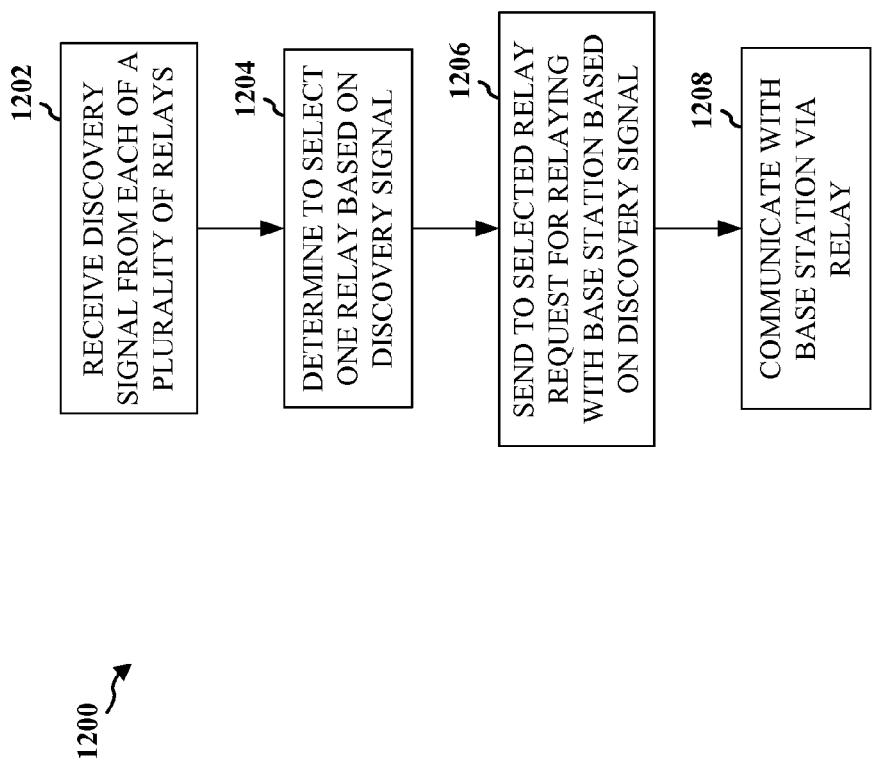
FIG. 12 is a flow chart of a method of wireless communication.

FIG. 12 is a flow chart 1200 of a method of wireless communication. The method may be performed by a UE, such as an edge UE. At step 1202, the UE receives a discovery signal from each of a plurality of relays. The discovery signal may be broadcasted to the UE in a periodic manner.

At step 1204, the UE determines to select one of the plurality of relays based on the discovery signal from each relay. At step 1206, the UE sends to a selected relay a request for relaying with a base station based on the discovery signal when one of the plurality of relays is determined to be selected. At step 1208, the UE communicates with the base station via the selected relay.

Figure 13:
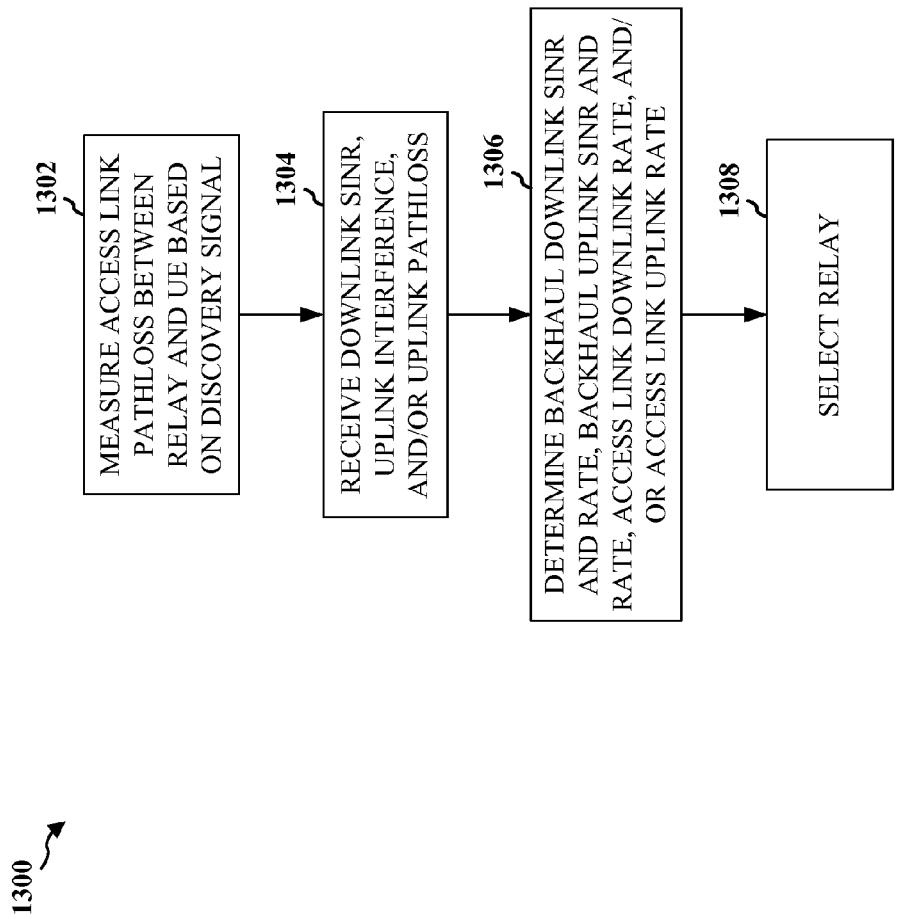
FIG. 13 is a flow chart of a method of wireless communication.

FIG. 13 is a flow chart 1300 of a method of wireless communication further detailing step 1204 of FIG. 12, wherein one of the plurality of relays is determined to be selected. The method may be performed by a UE, such as an edge UE.

For each of the plurality of relays, at step 1302, the UE measures an access link pathloss between a relay and the UE based on the received discovery signal. Thereafter, at step 1304, the UE receives at least one of a downlink signal-to-interference-plus-noise ratio (SINR), an uplink interference, or an uplink pathloss. At step 1306, the UE determines at least one of a backhaul downlink SINR and rate, a backhaul uplink SINR and rate, an access link downlink rate, or an access link uplink rate based on the received discovery signal and the access link pathloss. Finally, after steps 1302, 1304, and 1306 are performed for each of the plurality of relays, at step 1308, the UE selects one of the plurality of relays based on a respective determining of the at least one of the backhaul downlink SINR and rate, the backhaul uplink SINR and rate, the access link downlink rate, or the access link uplink rate. The selected relay may be selected to be a downlink relay and/or an uplink relay.

Figure 14:
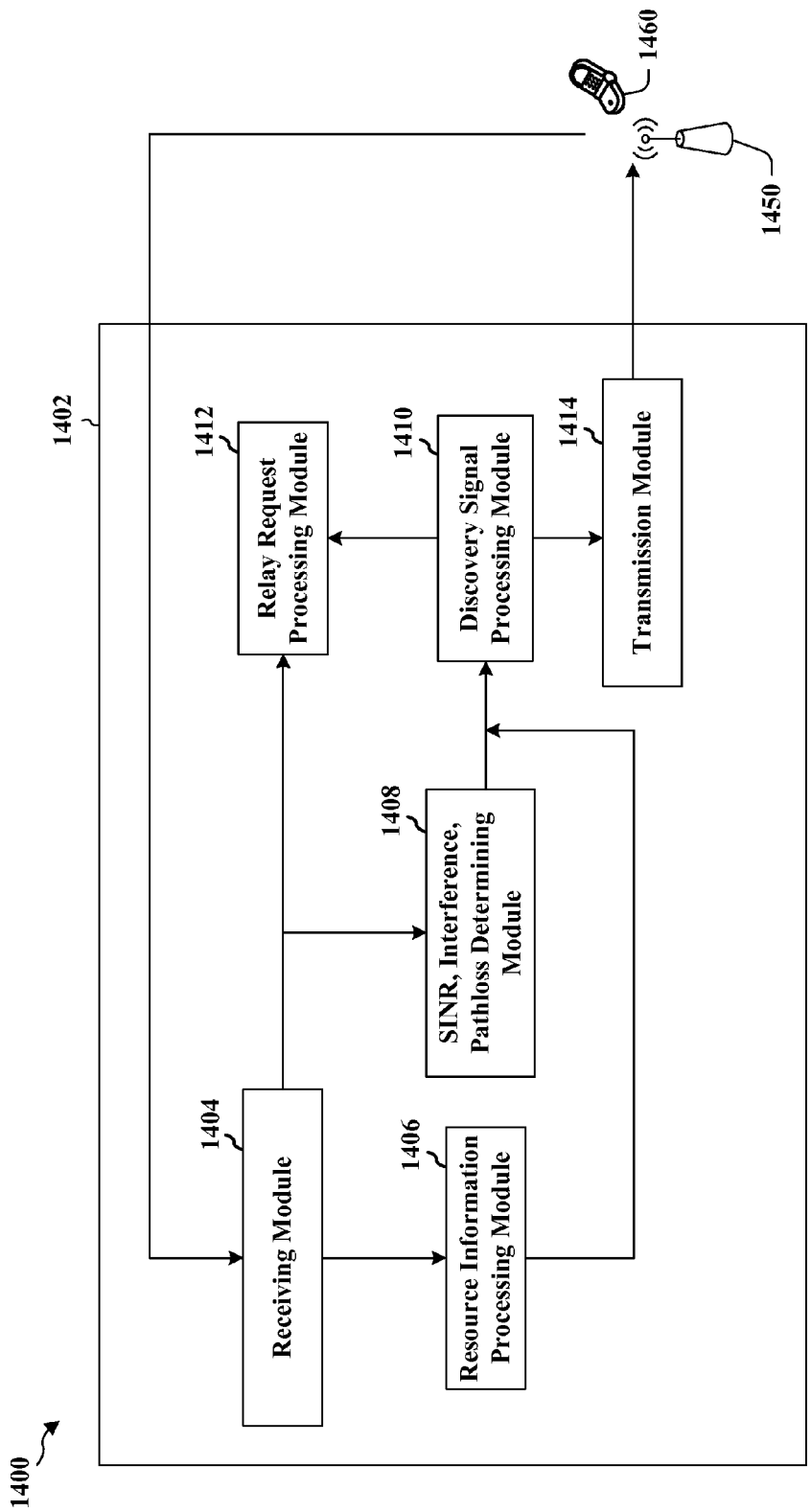
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a relay, such as a relay UE. The apparatus includes a receiving module 1404, a resource information processing module 1406, an SINR, interference, pathloss (SIP) determining module 1408, a discovery signal processing module 1410, a relay request processing module 1412, and a transmission module 1414.

The resource information processing module 1406 receives, via the receiving module 1404, discovery resource information from a base station 1450. The SIP determining module 1408 may determine a backhaul downlink signal-to-interference-plus-noise ratio (SINR), a backhaul uplink interference, and/or a backhaul uplink pathloss.

The discovery signal processing module 1410 sends, via the transmission module 1414, a discovery signal based on the discovery resource information. The discovery signal may be sent in a periodic manner to at least one UE, such as UE 1460. The transmission module 1414 may broadcast the discovery signal to the at least one UE. The discovery signal may include the determined backhaul downlink SINR, backhaul uplink interference, and/or backhaul uplink pathloss. The relay request processing module 1412 may receive from the at least one UE (e.g., UE 1460) a request for relaying with the base station 1450 based on the discovery signal.

Figure 15:
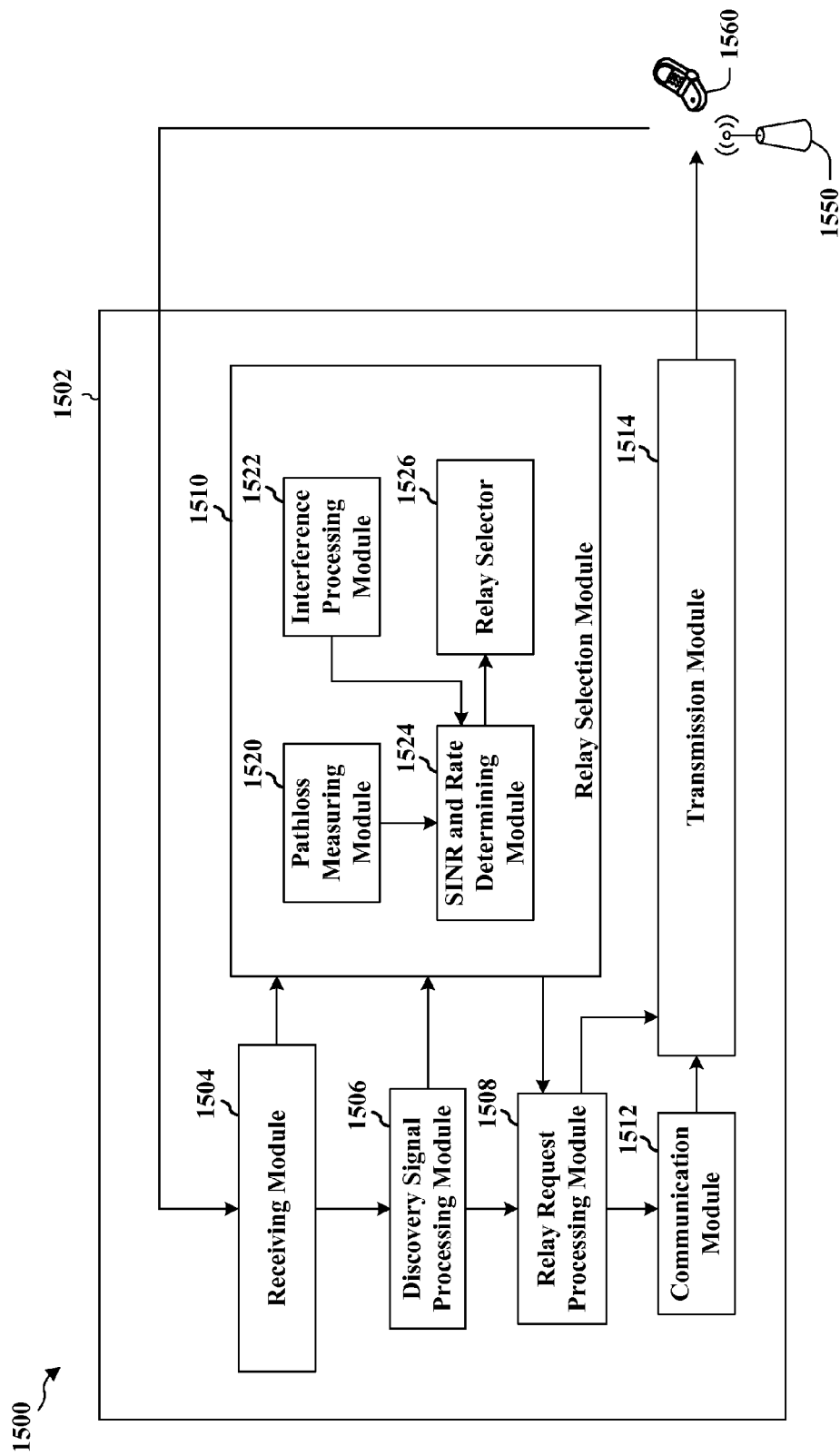
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE, such as an edge UE. The apparatus includes a receiving module 1504, a discovery signal processing module 1506, a relay request processing module 1508, a relay selection module 1510, a communication module 1512, and a transmission module 1514. The relay selection module 1510 includes a pathloss measuring module 1520, an interference processing module 1522, an SINR and rate determining module 1524, and a relay selector 1526.

In an aspect, the discovery signal processing module 1506 receives, via the receiving module 1504, a discovery signal from a relay 1560. The discovery signal may be broadcasted to the apparatus 1502 in a periodic manner. The discovery signal may include a backhaul downlink signal-to-interference-plus-noise ratio (SINR), a backhaul uplink interference, and/or a backhaul uplink pathloss. The relay request processing module 1508 sends to the relay 1560, via the transmission module 1514, a request for relaying with a base station 1550 based on the discovery signal.

In another aspect, the discovery signal processing module 1506 receives, via the receiving module 1504, a discovery signal from each of a plurality of relays, such as relay 1560. The discovery signal may be broadcasted to the apparatus 1502 in a periodic manner. The relay selection module 1510 determines to select one of the plurality of relays based on the discovery signal from each relay. The relay request module 1508 sends to a selected relay (e.g., relay 1560) a request for relaying with a base station 1550 based on the discovery signal when one of the plurality of relays is determined to be selected. The communication module 1512 communicates with the base station 1550 via the selected relay (e.g., relay 1560).

In a further aspect, an operation of the relay selection module 1510 for determining to select one of the plurality of relays may be further detailed. For example, for each of the plurality of relays, the pathloss measuring module 1520 measures an access link pathloss between a relay (e.g., relay 1560) and the apparatus 1502 based on the received discovery signal. Thereafter, the interference processing module 1522 receives at least one of a downlink signal-to-interference-plus-noise ratio (SINR), an uplink interference, or an uplink pathloss. The SINR and rate determining module 1524 then determines at least one of a backhaul downlink SINR and rate, a backhaul uplink SINR and rate, an access link downlink rate, or an access link uplink rate based on the received discovery signal and the access link pathloss. Finally, after the above-described operations are performed for each of the plurality of relays, the relay selector 1526 selects one of the plurality of relays based on a respective determining of the at least one of the backhaul downlink SINR and rate, the backhaul uplink SINR and rate, the access link downlink rate, or the access link uplink rate. The selected relay may be selected to be a downlink relay and/or an uplink relay.

The apparatus may include additional modules that perform each of the steps of the algorithm in the aforementioned flow charts of FIGS. 10-13. As such, each step in the aforementioned flow charts of FIGS. 10-13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
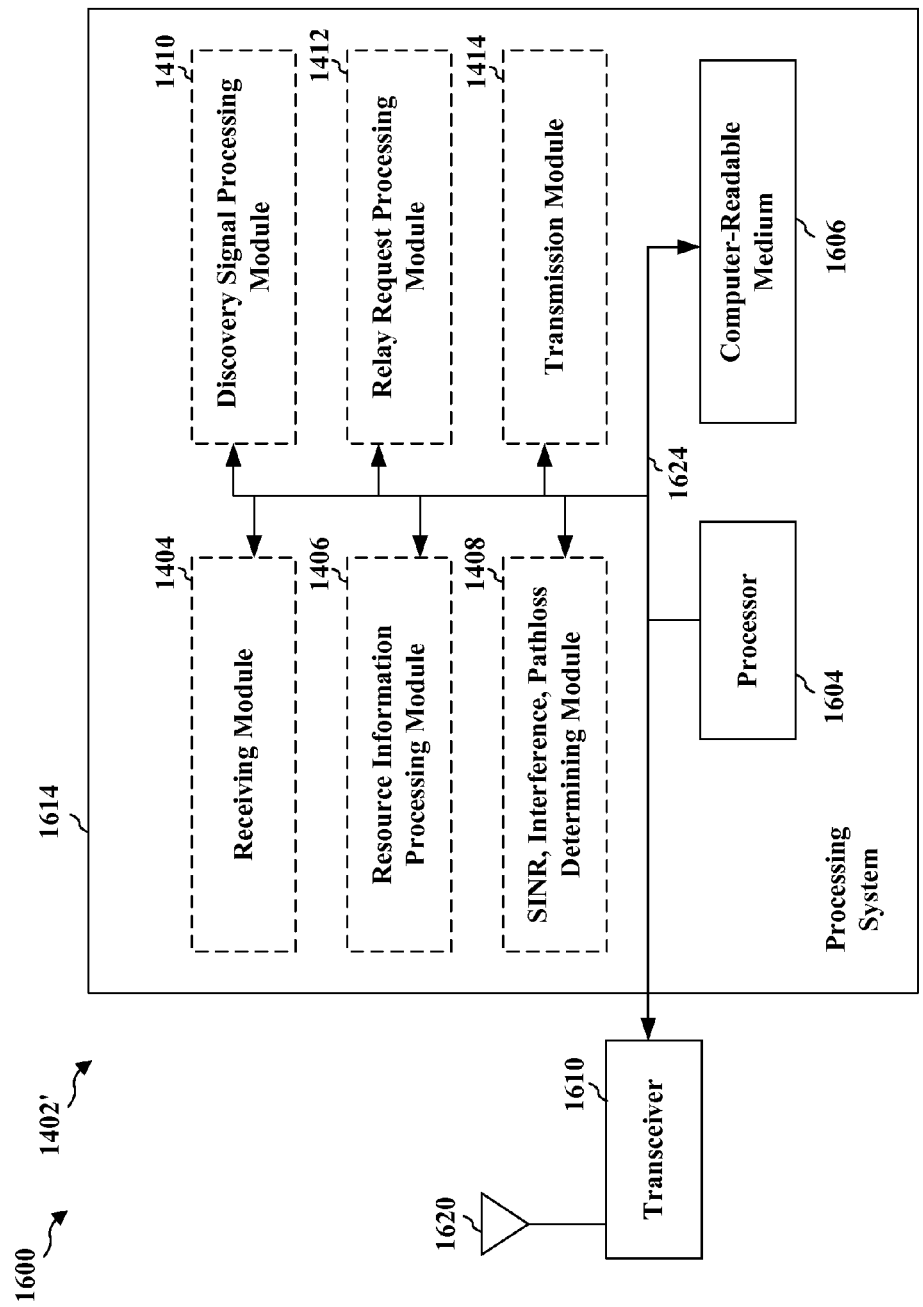
FIG. 16 is a diagram illustrating an example of a hardware implementation for an apparatus employing a processing system.

FIG. 16 is a diagram 1600 illustrating an example of a hardware implementation for an apparatus 1402' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1404, 1406, 1408, 1410, 1412, 1414, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1404, 1406, 1408, 1410, 1412, and 1414. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1402/1402' for wireless communication includes means for receiving discovery resource information from a base station, means for sending a discovery signal based on the discovery resource information, means for receiving from at least one user equipment (UE) a request for relaying with the base station based on the discovery signal, and means for determining at least one of a backhaul downlink signal-to-interference-plus-noise ratio (SINR), a backhaul uplink interference, or a backhaul uplink pathloss, wherein the discovery signal comprises the determined at least one of the backhaul downlink SINR, the backhaul uplink interference, or the backhaul uplink pathloss.

The aforementioned means may be one or more of the aforementioned modules of the apparatus 1402 and/or the processing system 1614 of the apparatus 1402' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 17:
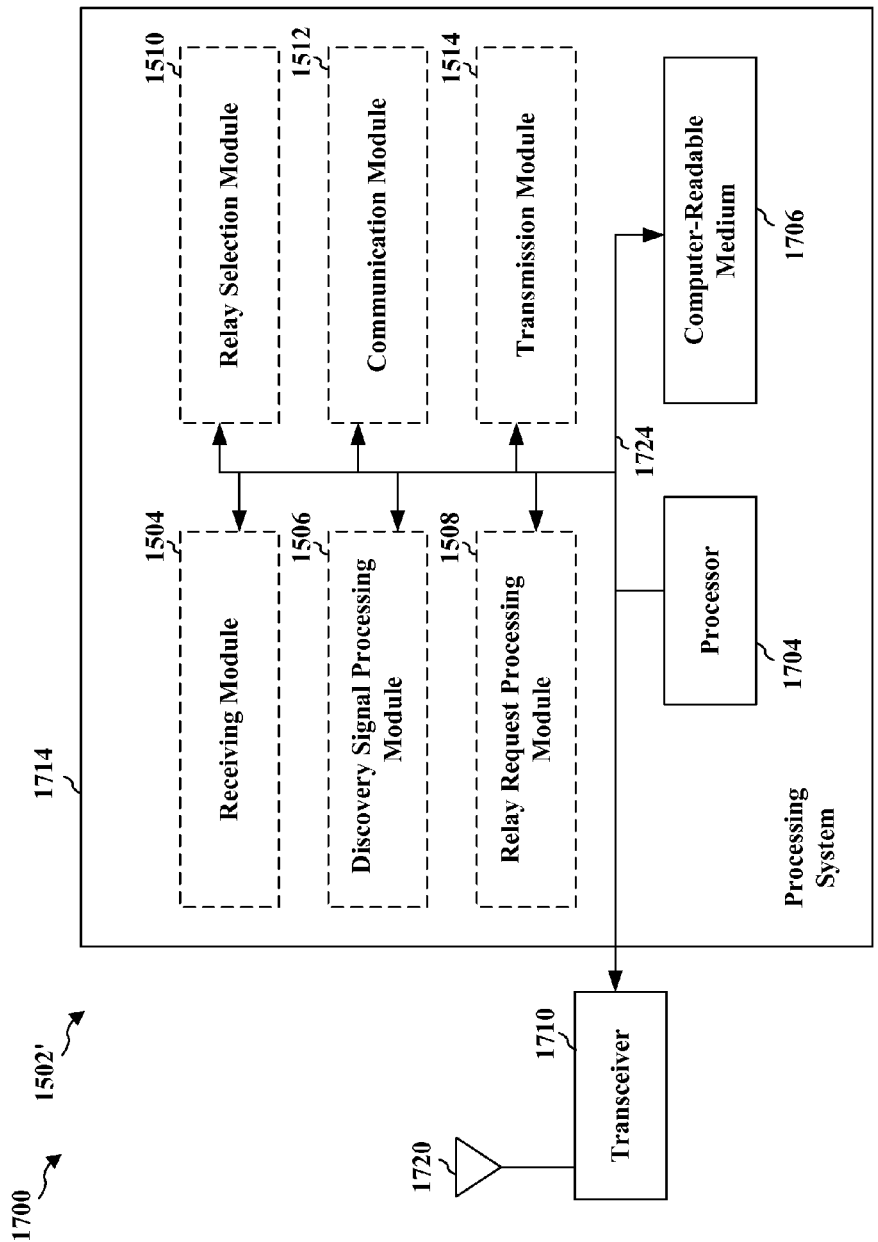
FIG. 17 is a diagram illustrating an example of a hardware implementation for an apparatus employing a processing system.

FIG. 17 is a diagram 1700 illustrating an example of a hardware implementation for an apparatus 1502' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1504, 1506, 1508, 1510, 1512, 1514, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1504, 1506, 1508, 1510, 1512, and 1514. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1502/1502' for wireless communication includes means for receiving at a user equipment (UE) a discovery signal from a relay, means for sending to the relay a request for relaying with a base station based on the discovery signal, means for receiving at a user equipment (UE) a discovery signal from each of a plurality of relays, means for determining to select one of the plurality of relays based on the discovery signal from each relay, means for sending to a selected relay a request for relaying with a base station based on the discovery signal when one of the plurality of relays is determined to be selected, and means for communicating with the base station via the selected relay.

The aforementioned means may be one or more of the aforementioned modules of the apparatus 1502 and/or the processing system 1714 of the apparatus 1502' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
    receiving discovery resource information from a base station;
    determining at least one of a downlink signal to interference-plus-noise ratio (SINR), an uplink interference or an uplink pathloss;
    deriving synchronization information from a macro network;
    sending a discovery signal based on the discovery resource information, wherein the discovery signal comprises the determined at least one of the downlink SINR, the uplink interference, or the uplink pathloss and wherein the discovery signal does not include synchronization information; and
    receiving from at least one user equipment (UE) a request for relaying with the base station based on the discovery signal.

2. The method of claim 1, further comprising broadcasting the discovery signal to the at least one user equipment (UE).

3. The method of claim 1, wherein the discovery signal is sent periodically.

4. An apparatus for wireless communication, the apparatus being a user equipment (UE), comprising:
    means for receiving discovery resource information from a base station;
    means for determining at least one of a downlink signal to interference-plus-noise ratio (SINR), an uplink interference or an uplink pathloss;
    means for deriving synchronization information from a macro network;
    means for sending a discovery signal based on the discovery resource information, wherein the discovery signal comprises the determined at least one of the downlink SINR, the uplink interference, or the uplink pathloss and wherein the discovery signal does not include synchronization information; and
    means for receiving from at least one user equipment (UE) a request for relaying with the base station based on the discovery signal.

5. The apparatus of claim 4, further comprising means for broadcasting the discovery signal to the at least one user equipment (UE).

6. The apparatus of claim 4, wherein the discovery signal is sent periodically.

7. A method of wireless communication at a user equipment (UE), comprising:
    receiving discovery resource information from a base station;
    determining at least one of a downlink signal to interference-plus-noise ratio (SINR), an uplink interference or an uplink pathloss;
    deriving synchronization information from a macro network and not retransmitting the synchronization information to another UE;
    sending a discovery signal based on the discovery resource information, wherein the discovery signal comprises the determined at least one of the downlink SINR, the uplink interference, or the uplink pathloss and wherein the discovery signal does not include synchronization information; and
    receiving from at least one UE a request for relaying with the base station based on the discovery signal.

8. The method of claim 7, further comprising broadcasting the discovery signal to the at least one user equipment (UE).

9. The method of claim 7, wherein the discovery signal is sent periodically.

10. An apparatus for wireless communication the apparatus being a user equipment (UE), comprising:
    means for receiving discovery resource information from a base station;
    means for determining at least one of a downlink signal to interference-plus-noise ratio (SINR), an uplink interference or an uplink pathloss;
    means for deriving synchronization information from a macro network and not retransmitting the synchronization information to another UE;
    means for sending a discovery signal based on the discovery resource information, wherein the discovery signal comprises the determined at least one of the downlink SINR, the uplink interference, or the uplink pathloss and wherein the discovery signal does not include synchronization information; and
    means for receiving from at least one UE a request for relaying with the base station based on the discovery signal.

11. The apparatus of claim 10, further comprising means for broadcasting the discovery signal to the at least one user equipment (UE).

12. The apparatus of claim 10, wherein the discovery signal is sent periodically.

* * * * *